DIGITAL COMPUTER GATING DEVICE

Filed April 19, 1962 4 Sheets-Sheet 1

INVENTOR.
O D PARHAM,
BY
Robert H. Himes
ATTORNEY.

INVENTOR.
O D PARHAM.
BY
Robert H. Himes
ATTORNEY.

Nov. 3, 1964 O D PARHAM 3,155,846

DIGITAL COMPUTER GATING DEVICE

Filed April 19, 1962 4 Sheets-Sheet 3

INVENTOR.
O D PARHAM,
BY Robert H. Himes
ATTORNEY

DIGITAL COMPUTER GATING DEVICE

INVENTOR.
O D PARHAM,
BY
Robert H. Himes
ATTORNEY.

United States Patent Office 3,155,846

Patented Nov. 3, 1964

3,155,846

DIGITAL COMPUTER GATING DEVICE

O D Parham, Downey, Calif., assignor to Hughes Aircraft Company, Culver City, Calif., a corporation of Delaware Filed Apr. 19, 1962, Ser. No. 188,688
7 Claims. (Cl. 307—88.5)

This invention relates to digital computer gating devices hereafter designated as "or" and "nor" gates and, more particularly, to digital computer gating apparatus capable of providing extremely fast logic rates.

In the mechanization of apparatus for performing various computational problems, speed requirements have often necessitated the use of a parallel system as distinguished from a serial system. Extremely fast serial systems or subsystems made feasible by the gating devices of the present invention will thus minimize the need for a parallel system.

It is therefore an object of the present invention to provide improved digital computer gating apparatus.

Another object of the present invention is to provide digital computer gating apparatus capable of providing extremely fast logic rates.

Still another object of the present invention is to provide "or" and "nor" gating devices capable of operating at clock rates in excess of 100 megacycles.

A further object of the present invention is to provide "or" and "nor" digital computer gating devices which exploit the characteristics of tunnel and backward diodes.

A still further object of the present invention is to provide "nor" and "or" digital computer gating devices which place a substantially constant current drain on the associated direct current power sources.

In accordance with the present invention, current flow through first and second serially connected tunnel diodes is controlled in a manner to produce changes in potential level at the junction therebetween which constitutes the output of the device. More particularly, circuitry instrumenting "or" or "nor" logic is employed to divert current from at least one of the tunnel diodes thereby to cause a switch in the mode of current flow therethrough. That is, the same value of current through a tunnel diode corresponds to two different voltage drops thereacross, the particular one depending upon whether or not the peak current, $I_p$, of the particular tunnel diode had been exceeded. Further, it has been determined that switching between modes of current flow through a tunnel diode takes place in a period of time less than 0.3 nanosecond thus making it possible to achieve extremely fast switching. Lastly, a sinusoidal clock signal which may have a frequency as high as 100 megacycles or more is employed to periodically clear the gating devices of the present invention.

The above-mentioned and other features and objects of this invention and the manner of obtaining them will become more apparent by reference to the following description taken in conjunction with the accompanying drawings wherein.

Figures 6, 7:
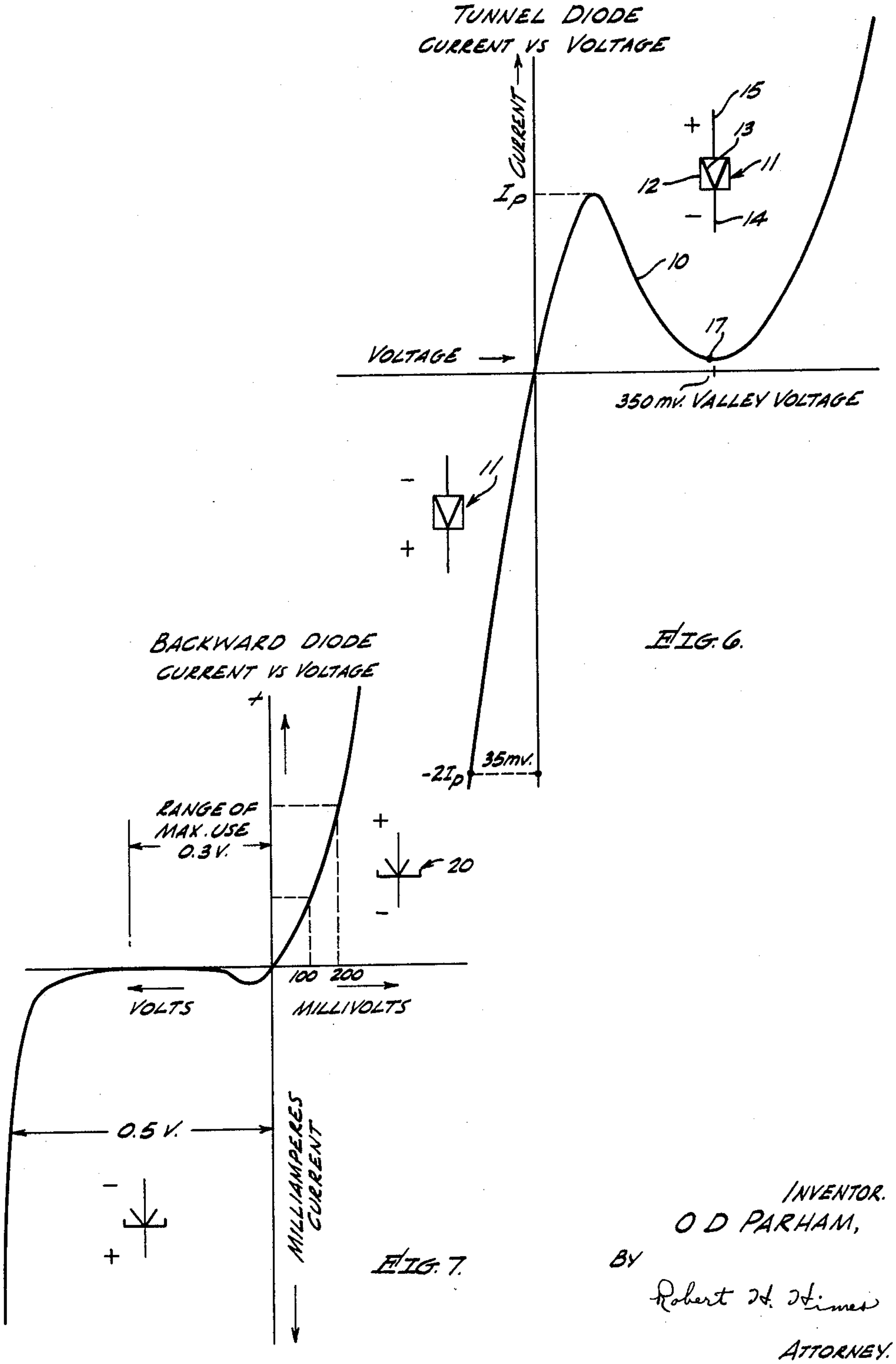
FIGS. 6 and 7 illustrate typical current-voltage characteristics of tunnel and backward diodes of the type employed in the apparatus of FIGS. 1–4.

In the following description of the present invention, reference is made to tunnel and backward diodes. Referring to FIGS. 6 and 7 of the drawings, there is illustrated current-voltage characteristics of tunnel and backward diodes, respectively, together with the manner in which they are designated in the remainder of the drawings. Referring now to FIG. 6, there is illustrated a typical current vs. voltage characteristic 10 of the tunnel diode wherein current flow is indicated along the abscissa and voltage-drop across the diode is indicated along the ordinate. In addition, a symbol 11 is employed to designate a tunnel diode. Symbol 11 constitutes a square 12 enclosing a V 13 which extends from one side of the square 12 to the mid-point of the opposite side thereof. Cathode lead 14 connects to the vertex of the V 13 and an anode lead 15 connects to the mid-point of the side of the square 12 opposite the vertex of the V 13. Normal current flow through the tunnel diode 11 is considered to be from anode 15 to cathode 14 and is represented by positive values of current flow of the characteristic 10. Current flow through the tunnel diode 11 in a backward direction is considered to be current flow from the cathode 14 to the anode 15. Under these circumstances the cathode 14 is necessarily positive relative to the anode 15. Current flow of this type is represented by the negative values of current flow of the characteristic 10. In particular, current flow in a normal direction through a tunnel diode increases in proportion to the voltage drop thereacross until a peak current, $I_p$, is reached. Operation of a tunnel diode at currents less than $I_p$ is designated as operation in the "non-switched" mode and operation at currents in excess of $I_p$ is designated as operation in the "switched" mode. Further, increasing the current through a tunnel diode is designated as "setting" the tunnel diode, i.e., changing the mode of operation from the non-switched to the switched mode. Lastly, the voltage drop across the tunnel diode corresponding to the peak current, $I_p$, is referred to as the peak voltage, $V_p$. After the peak current, $I_p$, is reached, the voltage drop continues to increase with a decrease in current until a null is reached designated by point 17 on the characteristic 10. This null at point 17 is generally referred to as the "valley voltage," $V_v$, of the tunnel diode and occurs, for example, at a voltage of the order of 350 millivolts. Increases in voltage across a tunnel diode in excess of the "valley voltage," $V_v$, of the tunnel diode and occurs, for With regard to current flow through a tunnel diode in a backward direction, current flow in general increases in proportion to the voltage drop thereacross with a current flow equal to twice the peak current, $I_p$, of the tunnel diode corresponding generally to a voltage drop thereacross equal to 0.1 the valley voltage of the tunnel diode. For the purposes of the present invention, any device having a current-voltage characteristic that is of the same type as the current-voltage characteristic 10 is considered to be the equivalent of a tunnel diode and, as such, is within the scope of the teachings of this specification.

Referring now to FIG. 7 of the drawings, symbol 20 is employed to designate a backward diode and constitutes a short transverse line disposed across a lead together with a V having the vertex thereof at the intersection. Normal current flow through a backward diode is considered to be in the direction indicated by the V (when considered as an arrow) and is represented by the portion of a characteristic 22 which corresponds to positive current flow.

Backward current flow through a backward diode constitutes current flow therethrough in the opposite direction and corresponds to the portion of characteristic 22 where the current flow is negative. In general, when the current flow through the backward diode is in the normal direction, the potential drop thereacross increases proportionately to the current flow therethrough as illustrated by the upper portion characteristic 22, as viewed in the drawing. In the backward direction, however, there is a slight negative current in regions where the backward voltage drop thereacross is small. This current, however, decreases to zero and remains at zero until voltage drops of the order of 0.4 volt are reached. After this point, current flow rapidly increases with a maximum voltage drop thereacross of the order of 0.5 volt. For this reason, maximum backward voltage normally used across a backward diode having a characteristic of the same type as characteristic 22 is generally of the order of 0.3 volt. Although backward diodes are described in the gating networks of the following embodiments, it is only necessary that this type of diode be used when extremely fast speeds of operation are desired.

Figure 1:
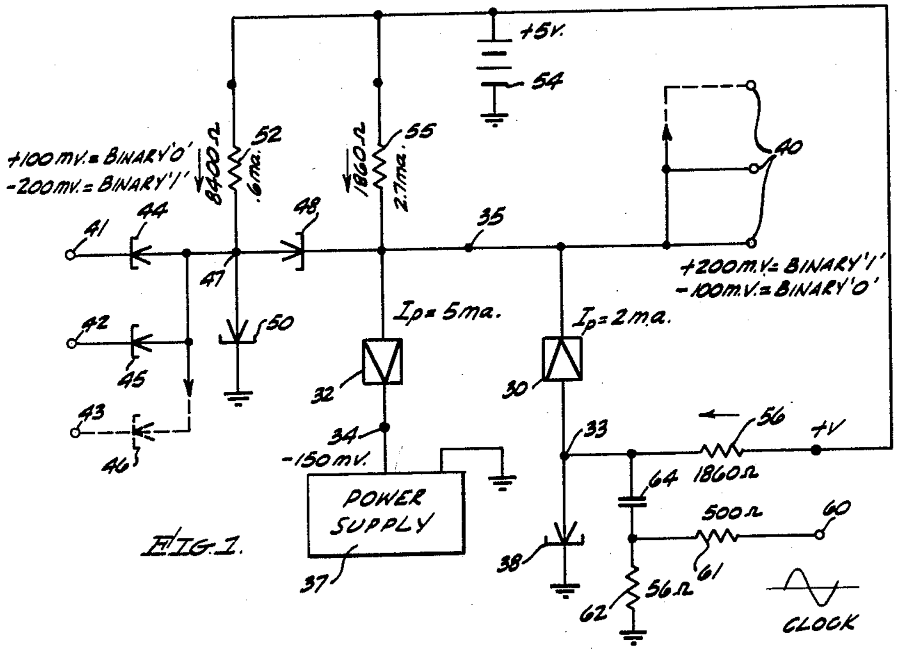
FIG. 1 shows a preferred embodiment of a "nor" gate in accordance with the present invention adapted to provide positive current output.

Referring now to FIG. 1 of the drawings, there is shown a preferred embodiment of a "nor" gate in accordance with the present invention adapted to generate a binary "1" gating signal of positive polarity at the output thereof. In particular, tunnel diodes 30, 32 are serially connected from a junction 33 to a junction 34 and are poled in a manner to allow normal current flow proceeding from junction 33 to junction 34. A junction 35 constitutes the common junction intermediate the tunnel diodes 30, 32. Also, in accordance with the present invention, tunnel diode 30 is of a type having a peak current, $I_p$, of 2 milliamperes and tunnel diode 32 is of a type which has a peak current, $I_p$, which is no less than the peak current of diode 30 and is preferably of the order of 5 milliamperes. Tunnel diodes 30, 32 are presently available commercially as 1N2969 and 1N2941, respectively. The junction 34 is maintained at a fixed direct-current potential of the order of −150 millivolts relative to ground by means of a connection therefrom to a power supply 37 which is, in turn, referenced to ground. The junction 33, on the other hand, is returned to ground through a backward diode 38, which diode 38 is poled in a direction to allow normal current flow from junction 33 towards ground. The purpose of backward diode 38 is to prevent the potential difference between junctions 33, 34 from exceeding 400 millivolts so that tunnel diodes 30, 32 cannot be switched simultaneously and, in addition, prevents the tunnel diodes 30, 32 from operating too far into the region where the voltage thereacross exceeds the valley voltage, $V_v$, where the recovery time of the respective diode is slow.

An output from the disclosed gating apparatus is provided by appropriate connections from the junction 35 intermediate the tunnel diodes 30, 32 to output terminals 40. The output signal produced is in the nature of a "current" or "no current." Inputs to the device are provided by input terminals 41, 42, 43. The input terminals 41, 42, 43 are connected through backward diodes 44, 45, 46, respectively, to a common junction 47, which junction 47 is, in turn, connected through a backward diode 48 to the junction 35 and, in addition, is returned to ground through a backward diode 50. The backward diodes 44, 45, 46 are poled in a manner to allow normal current flow towards the input terminals 41, 42, 43, respectively; the backward diode 48 is poled in a manner to allow normal current flow towards the junction 35; and the backward diode 50 is poled in a manner to allow normal current flow towards ground. Next, a source of substantially constant current flow towards the junction 47 is provided by a resistor 52 connected from the junction 47 to the positive terminal of a battery 54, the remaining terminal of which is referenced to ground. The resistor 52 has a resistance of the order of 8400 ohms, and the battery 54 provides a potential of the order of +5 volts whereby a substantially constant current of the order of 0.6 milliampere flows through the resistor 52 towards the junction 47. Further, a resistor 55 is connected from the junction 35 to the positive terminal of the battery 54 and has resistance of the order of 1860 ohms whereby a substantially constant current of the order of 2.7 milliamperes flows toward the junction 35. Further, a resistor 56 is connected from the junction 33 to the positive terminal of battery 54 and has a resistance of the order of 1860 ohms whereby a substantially constant current of the order of 2.7 milliamperes flows toward the junction 33.

The apparatus of the present invention is adapted, but not restricted, to function in response to a sinusoidal clock signal which is applied to a terminal 60. Terminal 60 is connected through a resistor dividing network to ground constituting resistors 61, 62, which resistors are serially connected in the order named from terminal 60 to ground. Resistor 61 has a resistance of the order of 500 ohms and resistor 62 has a resistance of the order of 56 ohms thereby to provide a voltage at the common junction therebetween which is approximately 10% of the voltage applied to the clock input terminal 60. The purpose for this is to allow the use of a larger amplitude clock signal so as to minimize any effects due to variations in amplitude. The voltage appearing at the junction between resistors 61, 62 is coupled through a capacitor 64 to the junction 33 at one extremity of the tunnel diode 30. The capacitance of capacitor 64 is not critical and may, for example, be of the order of 120 micromicrofarads.

Figure 5:
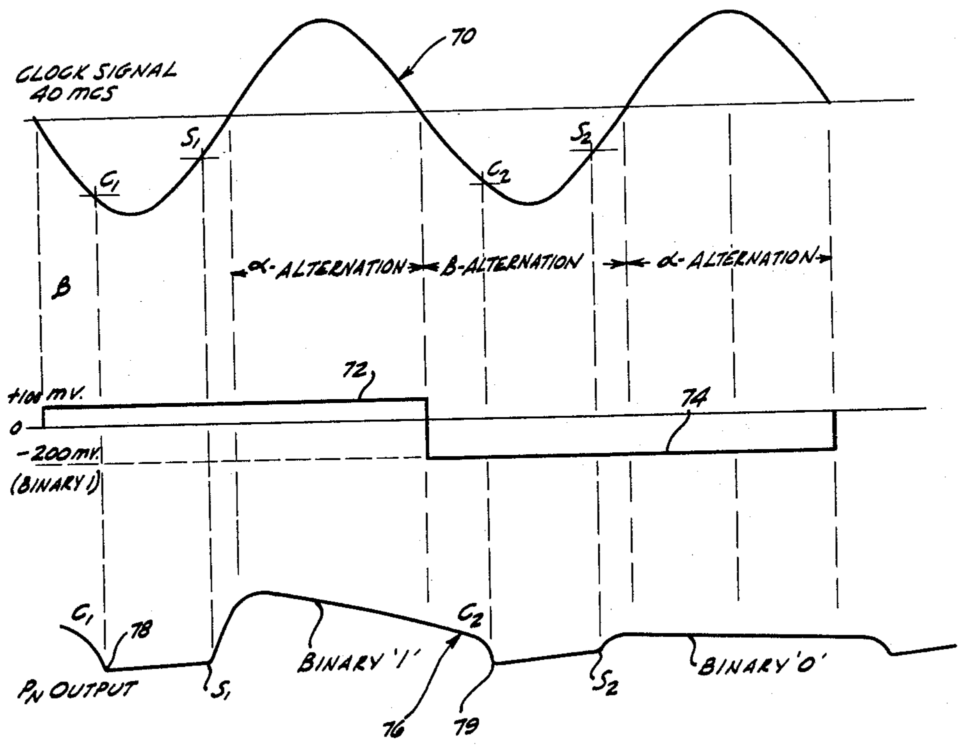
FIG. 5 illustrates waveforms of the clock together with waveforms available at the respective input and output of the gating device of FIG. 1 when operating at a clock rate of 40 megacycles.

In the operation of the apparatus of FIG. 1, signals representative of either binary "1" or binary "0" are applied to the input terminals 41, 42, 43. For this purpose, the potential level of binary "0" is defined at +100 millivolts and corresponds to zero current flow. The potential level of binary "1," on the other hand, is defined as −200 millivolts and corresponds to a current flow of the order of 0.6 milliampere towards the input terminals 41, 42, or 43 through the backward diodes 44, 45 or 46, respectively. In addition, a sinusoidal clock signal having a waveform 70, FIG. 5, is applied to the clock input terminal 60. The frequency of the clock signal determines, of course, the speed at which the apparatus functions. The frequency of this clock signal may be as low as one megacycle or less and as high as several hundred megacycles depending on the nature of the computer system. In the present case, the waveform 70 having a clock frequency of 40 megacycles, together with associated input and output waveforms corresponding to this frequency, are illustrated in FIG. 5. In the following description, the positive alternation of the clock signal 70 is referred to as the "α alternation" and the negative alternation is referred to as the "β alternation." Lastly, as will be evident from the following description, the waveform of the clock signal, although preferably sinusoidal, may assume other periodic configurations.

The apparatus of the present invention generates an output signal having one of two different potential levels thereby to produce potential levels representative of either binary "1" or binary "0" at the output terminals 40. Unlike the input terminals 41, 42, 43, a potential level of −100 millivolts at the output terminals 40 corresponds to binary "0" and also to zero current flow. An output potential level of +200 millivolts at the output terminals 40, on the other hand, is representative of binary "1" and corresponds to a current flow from the output junction 35 towards the output terminals 40. First, input signals corresponding to binary "0" are applied to each of the input terminals 41, 42, 43, such as represented by a potential level 72, FIG. 5, of +100 millivolts relative to ground. It is evident that to function as a "nor" gate, it is necessary that a signal representative of binary "1" or +200 millivolts be generated at the output terminals 40 in response to signals representative of binary "0" at the input terminals.

Referring now to FIG. 1, the potential source 54 generates a flow of current of the order of 2.7 milliamperes through the resistor 56 towards the junction 33; a flow of current of the order of 2.7 milliamperes through the resistor 55 towards the junction 35; and a flow of current of the order of 0.6 milliampere through the resistor 52 towards the junction 47. Inasmuch as the potential level at each of the input terminals 41, 42, 43 is at +100 millivolts, a substantial portion of the current of the order of 0.6 milliampere flowing through resistor 52 initially flows through the backward diode 48 to the junction 35. In addition, irrespective of the mode of conduction of tunnel diodes 30, 32, the clock pulse signal applied through capacitor 64 periodically lowers the potential at junction 33, and, hence, lowers the potential drop from junction 33 to junction 34 to the extent that the voltage drop across both tunnel diodes 30, 32 is sufficiently small to cause both tunnel diodes 30, 32 to revert to the unswitched mode of operation; i.e., current flow through each of the tunnel diodes 30 or 32 in this mode is less than the respective peak current, $I_p$. Under these circumstances, the tunnel diodes 30, 32 are both unswitched and the device is designated as having been "cleared." Subsequent to being cleared, the clock signal progressively increases the current flow through the tunnel diode 30 to the junction 35. Under these circumstances, the current flow through tunnel diode 32 is as follows:

$$I_{T32}=0.6+2.7+I_{T30} \qquad (1)$$

wherein $I_{T32}$ is the current (milliamperes) through tunnel diode 32; $I_{T30}$ is the current (milliamperes) through tunnel diode 30; the current of 0.6 milliampere is the current through resistor 52; and the current of 2.7 milliamperes is the current through resistor 55. As is evident from Equation 1, the current $I_{T32}$ will reach a value of 5 milliamperes, the peak current, $I_p$, of tunnel diode 32, prior to the current $I_{T30}$ reaching 2 milliamperes, the peak current, $I_p$, of tunnel diode 30. Upon the current $I_{T32}$ reaching 5 milliamperes, i.e., the peak current, $I_p$, of tunnel diode 32, the diode 32 is switched whereby the potential drop thereacross increases to approximately 350 millivolts. In that the backward diode 38 prevents the total potential drop from junction 33 to junction 34 from exceeding 400 millivolts, there is insufficient potential remaining to switch the remaining tunnel diode 30. The potential of junction 35 and, hence, the potential of output terminals 40 is determined by the potential drop across tunnel diode 32. In that the potential level of junction 34 is maintained at −150 millivolts relative to ground and the potential drop across tunnel diode 32 under these circumstances is 350 millivolts, the potential level available at junction 35 under these circumstances is necessarily +200 millivolts relative to ground. Immediately before and after being switched in this manner, the logic applied to the input terminals 41, 42, 43 has no effect on the potential level appearing at the output terminals 40. It is not until such time as the apparatus is "set" in the above-described manner that the logic applied to the input terminals has some effect.

Next, assume that a potential level of −200 millivolts represented by level 74, FIG. 5, appears at one or more of the input terminals 41, 42, 43. Irrespective of the signals appearing at the input terminals 41, 42, 43, the apparatus is periodically cleared in the above-described manner. Under this latter circumstance, however, the potential level of junction 47 is at −200 millivolts which is less than the potential level at junctions 35 or ground, thus diverting the current flow of 0.6 milliampere through resistor 52 from tunnel diode 32 to the input terminals 41, 42 or 43. Current flow now flowing through tunnel diode 32 is as follows:

$$I_{T32}=2.7+I_{T30} \qquad (2)$$

As current flow through tunnel diode 30 increases, it is evident that the peak current, $I_p$, of 2 milliamperes of tunnel diode 30 is reached prior to the peak current, $I_p$, of tunnel diode 32, which is 5 milliamperes. Thus, under the described circumstances, tunnel diode 30 is switched thereby preventing the switching of tunnel diode 32, as previously explained.

The tunnel diode 32, in any event, determines the potential level at the output terminals 40. As can be seen from characteristic 10 of FIG. 6, the peak voltage, $V_p$, of a tunnel diode is somewhat less than 100 millivolts and may be of the order of 50 millivolts. Thus, inasmuch as the junction 34 is maintained at −150 millivolts relative to ground by the power supply 37, a voltage drop of 50 millivolts across tunnel diode 32 maintains the output junction 35 together with the output terminals 40 at a potential level of −100 millivolts relative to ground.

Referring to FIG. 5, there is shown the waveform of clock signal 70 whereon the time "C" in the $\beta$ alternation is the instant the device is cleared and the time "S" in the $\beta$ alternation is the instant the device is set. In addition, there is shown a waveform 76 which illustrates the voltage variations at the output terminals 40 for the binary "0" input and binary "1" inputs represented by voltages levels 72, 74, respectively. As previously explained, the potential levels 72, 74 need only be present at the time, S. Proceeding along the waveform 76 from the left, as viewed in the drawing, the output level proceeding from a point 77 to time $C_1$ thereof corresponds to the circumstances where the tunnel diode 32 is in the switched position. At time $C_1$, the sinusoidal clock signal represented by waveform 70 clears the device thus returning diode 32 to the unset mode of current conduction. At this time, the potential level of waveform 76 decays from substantially +200 millivolts to −100 millivolts at point 78. The output potential level remains at this value until time $S_1$, at which instant the logic applied to the input terminals 41–43 is such as to cause the tunnel diode 32 to be switched. This being the case, the potential level of waveform 76 progressively increases to approximately +200 millivolts throughout the remainder of the $\beta$ alternation and into the next successive $\alpha$ alternation. Subsequent to increasing to +200 millivolts, the clock signal causes a decrease until time $C_2$ is reached, at which instant the device is again cleared. The potential level at the output again decreases until at a point 79 it decreases to −100 millivolts. At the time, $S_2$, the logic applied to the input is in this instance such as to require the tunnel diode 30 to be set, in which case the output potential level at output terminals 40 remain at substantially −100 millivolts relative to ground. In the operation of the device of the present invention, it is intended to clear and set the device of FIG. 1 during either the $\alpha$ or $\beta$ alternation of the clock signal of waveform 70. The exact instance at which clearing and setting occur may vary depending upon the amplitude of the clock signal applied to input terminal 60, the resistance of the resistor 56 and the voltage applied thereto, the capacitance of the capacitor 64, and the bias applied to backward diode 38 at the terminal opposite that of junction 33 (shown connected to ground). It is generally desirable to clear and set the device during either the $\alpha$ or $\beta$ alternation to provide logic during the next successive alternation of the clock signal for one of the remaining devices. In this respect, the setting of a subsequent device responsive to the waveform 76 would occur at times $S_3$ and $S_4$ prior to the device of FIG. 1 being cleared at times $C_1$, $C_2$, respectively.

Measurements have shown that the actual clearing or setting of the tunnel diodes 30, 32 of the device of FIG. 1 requires less than 0.35 nanosecond ($10^{-9}$ seconds).

Figure 2:
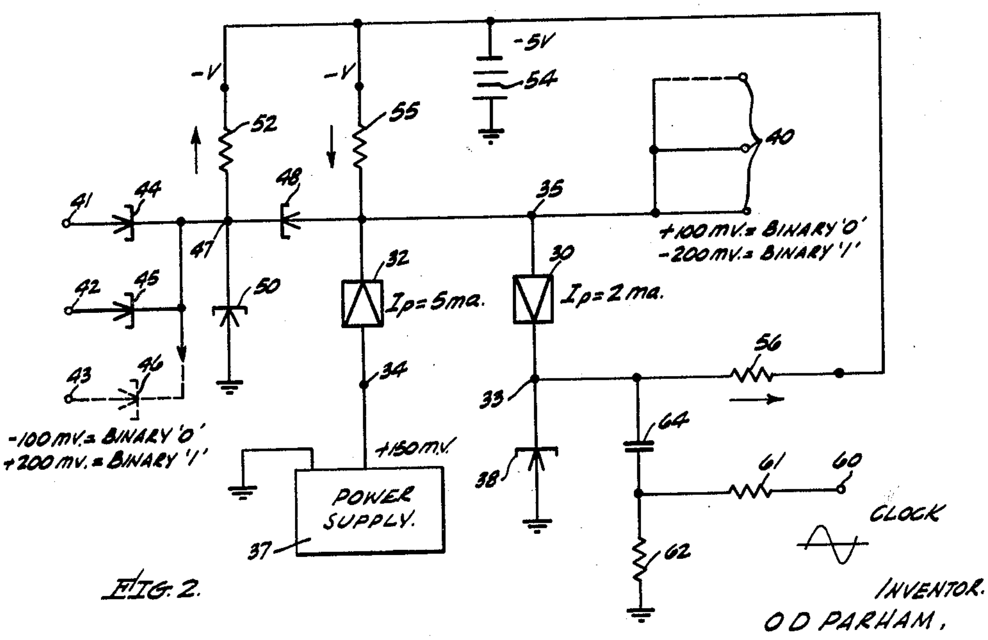
FIG. 2 shows a preferred embodiment of a "nor" gate in accordance with the present invention adapted to provide negative current output.

Referring now to FIG. 2, there is shown the device of FIG. 1 with appropriate modifications to effect operation as a "nor" gate with a signal of −200 millivolts representative of binary "1" and a signal of +100 millivolts representative of binary "0" and to transpose the clearing and switching times produced by the clock signal 70 180° in phase. In particular, the polarity of tunnel diodes 30, 32 is reversed from that described in FIG. 1 and the polarity of battery 54 is reversed, i.e., the positive terminal of battery 54 is referenced to ground and the negative terminal connected to the resistors 52, 55 and 56 thereby to reverse the current flow through these resistors. Also, the negative terminal of power supply 37 is referenced to ground and the positive terminal connected to the junction 34 thereby to maintain this junction at +150 millivolts instead of at −150 millivolts as for the device of FIG. 1.

In operation, input signals of a potential level of +100 or −200 millivolts, representative of binary "0" or binary "1," respectively, are applied to the input terminals 41, 42, 43 in the same manner as described in connection with FIG. 1. Signals of potential levels of −200 millivolts or +100 millivolts, representative of binary "1" or "0," respectively, are generated at the output terminals 40. As before, the clock signal 70 clears the device by decreasing the current flow through the tunnel diodes 30, 32 to the extent that current flow through each of the tunnel diodes reverts to the unswitched mode. Under these circumstances, current flows away from the junction 35 through the resistor 55, the backward diode 48 and resistor 52, and through the tunnel diode 30. On the other hand, current flows towards the junction 35 through tunnel diode 32. Assume first, that an input signal of a potential level of +100 millivolts, representative of binary "0" is applied to each of the input terminals 41, 42 or 43. As in the case of the device of FIG. 1, it is evident that tunnel diode 32 will switch, thereby producing a potential level of −200 millivolts, representative of binary "1" at the output terminals 40. Alternatively, when at least one of the input signals applied to input terminals 41, 42 or 43 is of a potential level of −200 millivolts, representative of binary "1," the current flow through resistor 52 from junction 35 is diverted and will henceforth flow from the input terminal to which this input signal is applied. Thus, as before, as the clock signal increases the flow of current through the tunnel diodes 30, 32, the peak current, 2 milliamperes, of the tunnel diode 30 will be reached first whereby tunnel diode 30 is switched. In this case a potential level of +100 millivolts, representative of binary "0," is generated at the output terminals 40.

Figure 3:
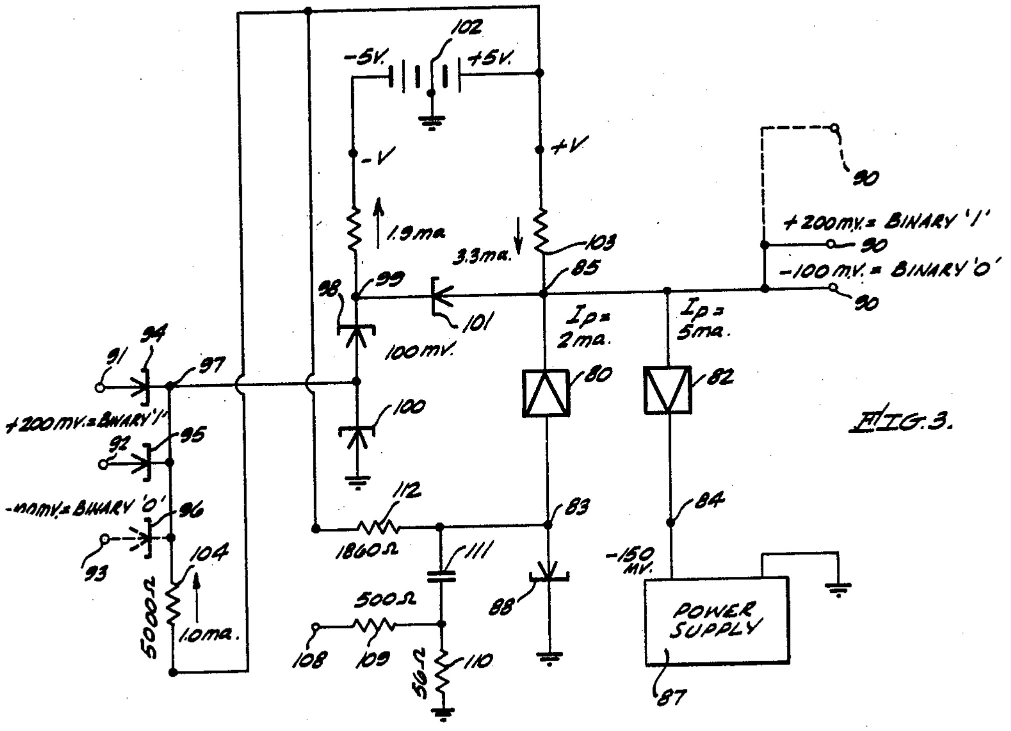
FIG. 3 shows a preferred embodiment of an "or" gate in accordance with the present invention which is adapted to provide positive current output.

Referring now to FIG. 3 of the drawings, there is shown a preferred embodiment of an "or" gate in accordance with the present invention adapted to be responsive to and to generate a binary "1" gating signal of positive polarity. In particular, tunnel diodes 80, 82 are serially connected from a junction 83 to a junction 84 and are poled in a manner to allow normal current flow from junction 83 to junction 84. A junction 85 constitutes the common junction intermediate the tunnel diodes 80, 82. Also, as in the case of tunnel diodes 30, 32, FIG. 1, tunnel diode 80 is of a type having a peak current, $I_p$, of 2 milliamperes, and tunnel diode 82 is of a type having a peak current, $I_p$, which is no less than the peak current diode 80 and is preferably of the order of 5 milliamperes. In addition, as in the case of tunnel diodes 30, 32, tunnel diodes 80, 82 are presently available commercially as 1N2969 and 1N2941, respectively. The junction 84 is maintained at a direct-current potential of the order of −150 millivolts relative to ground by means of a connection therefrom to a power supply 87 which is, in turn, referenced to ground. The junction 83, on the other hand, is returned to ground through a backward diode 88, which diode 88 is poled in a direction to allow normal current flow from junction 83 towards ground. As in the case of the device of FIG. 1, the function of backward diode 88 is to prevent the potential difference between junctions 83 and 84 from exceeding 400 millivolts so that the tunnnel diodes 80, 82 cannot both be switched and, in addition, to prevent the tunnel diodes 80, 82 from penetrating into the region where the voltage thereacross exceeds the valley voltage, $V_v$, where the recovery time of the respective diode is slow.

An output from the device is provided by appropriate connections from the junction 85 intermediate the tunnel diodes 80, 82 to output terminals 90. The output signal produced at the output terminals 90 is in the nature of a "current" or "no current" corresponding, respectively, to +200 millivolts, representative of binary "1," and −100 millivolts, representative of binary "0." Inputs to the device are provided by input terminals 91, 92, 93. The input terminals 91, 92, 93 are connected through backward diodes 94, 95, 96, respectively, to a common junction 97. Common junction 97 is, in turn, connected through a backward diode 98 to a junction 99 and, in addition, is returned to ground through a backward diode 100. The backward diodes 94, 95, 96 are poled in a manner to allow normal current flow towards the common junction 97, and the backward diodes 98, 100 are poled in a manner to allow normal current flow from ground towards the junction 99. As will hereinafter be explained in more detail, the purpose of backward diode 98 is to maintain the junction 97 positive with respect to junction 99 by from 100 to 150 millivolts. Next, a backward diode 101 is connected intermediate the junctions 85 and 99 and is poled to allow normal current flow from junction 85 towards junction 99.

Battery 102 having an intermediate terminal thereof referenced to ground provides a potential of the order of +5 volts at the positive terminal thereof and a potential of the order of −5 volts relative to ground at the negative terminal thereof. The positive terminal of battery 102 is connected through a resistor 103 to junction 85, through a resistor 104 to junction 97, and the negative terminal thereof is connected through a resistor 105 to the junction 99. The resistors 103, 104 have resistances of 1520 ohms and 5000 ohms, respectively, to provide substantially constant current flow of 3.3 milliamperes towards the junction 85 and of 1.0 milliampere towards the junction 97. Resistor 105, on the other hand, has a resistance of 2630 ohms to provide a substantially constant current flow of 1.9 milliamperes away from the junction 99. Irrespective of the input signals applied to the input terminals 91, 92 93, the current flow of 1.0 milliampere toward the junction 97 flows through the backward diode 98 to the junction 99 to maintain the junction 97 from 100 to 150 millivolts positive relative to the junction 99 as previously specified. It is considered well within the scope of the teachings of the present invention to achieve this potential difference by other means such as a resistor and a capacitor connected in parallel between the junctions 97, 99, for example.

As in the case of the device of FIG. 1, the device of FIG. 3 is adapted, but not restricted, to operate in response to the sinusoidal clock signal 70 which is applied to a terminal 108. Terminal 108 is connected through a resistor dividing network to ground constituting resistors 109, 110, which resistors are serially connected in the order named from terminal 108 to ground. Resistor 109 has a resistance of the order of 500 ohms and resistor 110 has a resistance of the order of 56 ohms thereby to provide a voltage at the junction therebetween which is approximately 10% of the voltage applied to the clock input terminal 108. The voltage appearing at the junction between resistors 109, 110 is coupled through a capacitor 111 to the junction 83 at one extremity of the tunnel diode 80. As before, the capacitor 111 has a capacitance of the order of 120 micromicrofarads. Lastly, the clock current through capacitor 111 is biased by a substantially constant current flow towards the junction 83 of the order of 2.7 milliamperes. This curent flow is provided by a resistor 112 connected intermediate the positive terminal of battery 102 at the junction 83 and having a resistance of 1860 ohms.

In the operation of the device of FIG. 3, the tunnel diodes 80, 82 are periodically cleared as a direct result of the decrease in current therethrough produced by the clock signal 70 in the same manner as for the device of FIG. 1. Input signals representative of either binary "1" or binary "0" are applied to the input terminals 91, 92, 93. Binary "0" is defined as a potential level of —100 millivolts and binary "1" as a potential level of 200 millivolts. In the event that all of the input signals applied to the input terminals 91, 92, 93 are representative of binary "0" and, as such, are of a potential level of —100 millivolts, substantially no current flows through the backward diodes 94, 95, 96. The reason for this is that current flow through the backward diode 100 maintains the potential of junction 97 at a potential of —100 millivolts relative to ground whereby the potential across the backward diodes 94, 95, 96 is substantially zero. At the junction 97, the current flow through backward diode 100 combines with the current flow of 1 milliampere through resistor 104 and flows through the backward diode 98 thereby to maintain the potential of junction 99 at —200 millivolts relative to ground. In that the potential of junction 85 together with that of the output terminals 90 is at —100 milivots, a current of the order of 0.6 milliampere flows through the backward diode 101 into the junction 99 to make up the 1.9 milliamperes flowing out of junction 99 through the resistor 105. Under these circumstances, only a portion of the 3.3 milliamperes flowing through the resistor 103 into junction 85 flows through the tunnel diode 82. More particularly, 0.6 milliampere of this current is diverted through the backward diode 101 leaving 2.7 milliamperes flowing through the tunnel diode 82. Thus, as the clock signal 70 increases the current flow through the tunnel diode 80, it is evident that the peak current, $I_p$, of 2 milliamperes of tunnel diode 80 will be exceeded while the current flow through the tunnel diode 82 is less than its peak current, $I_p$, of 5 milliamperes. Accordingly, when signals representative of binary "0" are applied to the input terminals 91, 92, 93, the tunnel diode 80 will switch, thus producing a potential at the junction 85 in the output terminals 90 of —100 millivolts. This latter potential of —100 millivolts is determined by the voltage drop across the tunnel diode 82 which, under these circumstances, is of the order of 50 millivolts. Thus, inasmuch as the junction 84 is maintained at —150 millivolts relative to ground, the potential at the output terminals 90 will be at —100 millivolts and representative of binary "0."

Consider now the circumstances when one of the input signals applied to input terminals 91, 92 or 93 is of a potential level of +200 millivolts, i.e., representative of binary "1." Current will now flow through the backward diode 94, 95 or 96 into the junction 97 increasing the potential thereof to approximately +100 millivolts relative to ground, thereby backbiasing the backward diode 100. This current combines with the 1 milliampere flowing through resistor 104 and flows through the backward diode 98 thereby to produce a potential level of zero volts at the junction 99. In that the potential level subsequent to being cleared at the output terminals 90 is —100 millivolts, the backward diode 101 between junctions 99 and 85 is now backbiased whereby no current flows therethrough from the junction 85. Under these circumstances, an increase in current through the tunnel diode 80 produced by the clock signal 70 combines with the 3.3 milliamperes flowing into junction 85 through resistor 103 and flows through the tunnel diode 82. The current through tunnel diode 82 thus reached 5 milliamperes, the peak current thereof, before the current flowing through tunnel diode 80 reaches 2 milliamperes. Thus, if one or more of the signals applied to the input terminals 91, 92 or 93 is representative of binary "1," the tunnel diode 82 will switch thus producing a voltage drop of 350 milivolts thereacross and a voltage of +200 millivolts at the junction 85 and the output terminals 90.

Figure 4:
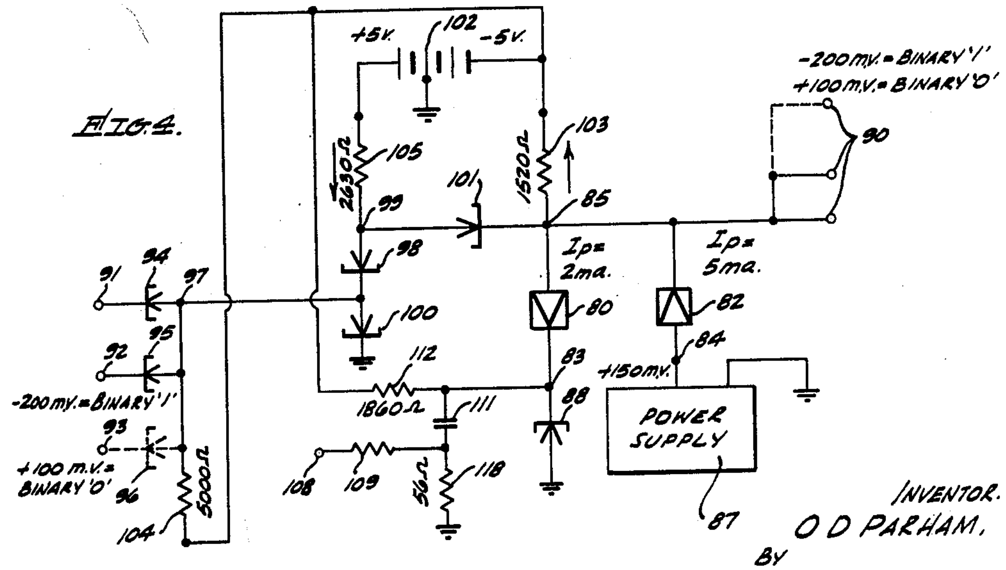
FIG. 4 shows a preferred embodiment of an "or" gate in accordance with the present invention adapted to provide negative current output.

Referring to FIG. 4, there is shown an "or" gate in accordance with the present invention adapted to operate in response to input signals of a potential level of —200 millivolts representative of binary "1" and having a potential level of +100 millivolts representative of binary "0." Output signals of a potential level of —100 millivolts, representative of binary "1," and of a potential level of +100 millivolts, representative of binary "0," are produced at output terminals 90. In general, the device of FIG. 4 is the same as that of FIG. 3 with the exception that the backward diodes 88, 94, 95, 96, 98, 100 and 101, together with the tunnel diodes 80, 82, are poled in the opposite direction and the polarity of the power supply 87 of battery 102 is reversed. Under these circumstances, clearing and switching is transposed 180° along the clock signal 70, FIG. 5. The operation of the remainder of the circuit is similar to that of FIG. 3 with the exception that all currents are reversed.

What is claimed is:

1. A digital computer device comprising:

(*a*) first and second tunnel diodes having first and second peak currents, respectively, serially connected in the order named from a first junction to an output junction and from said output junction to a second junction, said second peak current being greater than said first peak current and said first and second tunnel diodes being poled to allow normal current flow therethrough in a common direction from said first to said second junction;

(*b*) means connected to said second junction for maintaining said second junction at a first substantially fixed potential relative to a reference potential;

(*c*) means connected to said first junction for maintaining the potential difference between said first and second junctions at values less than the least sum of the valley voltage of one of said tunnel diodes and the peak voltage of the other tunnel diode;

(*d*) means connected to said output junction for maintaining a predetermined current flow through said second tunnel diode;

(*e*) means coupled to said first junction for periodically decreasing and increasing the current flow through said first and second tunnel diodes whereby both of said tunnel diodes periodically revert to the unswitched mode of current conduction in response to said periodic decreases in current flow thereby to produce a substantially constant first potential level at said output junction; and (*f*) means responsive to no less than one bi-level input signal for changing the current flow through at least one of said tunnel diodes thereby to selectively switch one or the other of said first and second tunnel diodes during each periodic increase in current flow therethrough as determined by a preselected combination of potential levels of said no less than one input signal whereby the switching of said second tunnel diode generates a second potential level at said output junction.

2. The digital computer device as defined in claim 1 wherein said means connected to said first junction for maintaining the potential difference between said first and second junctions at values less than the least sum of the valley voltage of one of said tunnel diodes and the peak voltage of the other tunnel diode includes a backward diode connected from said first junction to a third junction maintained at a second substantially fixed potential relative to said reference potential, said backward diode being poled to allow normal current flow therethrough in the same direction as said common direction with respect to said first junction.

3. The digital computer device as defined in claim 1 wherein said means coupled to said first junction for periodically decreasing and increasing the current flow through said first and second tunnel diodes constitutes a single phase source of sinusoidal potential and a direct-current source of biasing current connected to said first junction.

4. A digital computer device comprising:

(a) first and second tunnel diodes having first and second peak currents, respectively, serially connected in the other named from a first junction to an output junction and from said output junction to a second junction, said first and second tunnel diodes being poled to allow normal current flow therethrough from said first to said second junction and said second peak current being no less than said first peak current;

(b) means connected to said second junction for maintaining said second junction at a substantially fixed negative potential relative to a reference potential;

(c) a backward diode connected from said first junction to a third junction maintained at said reference potential, said backward diode being poled to allow normal current flow from said first to said third junction;

(d) means connected to said output junction for maintaining a predetermined current flow through said second tunnel diode;

(e) means including a source of single-phase sinusoidal potential coupled to said first junction for periodically decreasing and increasing the current flow through said first and second tunnel diodes whereby both of said tunnel diodes periodically revert to the unswitched mode of current conduction in response to said periodic decreases in current flow thereby to produce a substantially constant first potential level at said output junction; and (f) means responsive to a plurality of bi-level input signals representative of binary "1" or binary "0" for not increasing said current flow through said second tunnel diode when all of said plurality of bi-level input signals are representative of binary "0" and for increasing said current flow through said second tunnel diode when at least one of said plurality of bi-level input signals is representative of binary "1" thereby to switch said second tunnel diode during each periodic increase in current flow therethrough when no less than one of said plurality of input signals is representative of binary "1" whereby the switching of said second tunnel diode generates a second potential level at said output junction.

5. A digital computer device comprising:

(a) first and second tunnel diodes having first and second peak currents, respectively, serially connected in the order named from a first junction to an output junction and from said output junction to a second junction, said first and second tunnel diodes being poled to allow normal current flow therethrough from said first to said second junction and said second peak current being no less than said first peak current;

(b) means connected to said second junction for maintaining said second junction at a substantially fixed negative potential relative to a reference potential;

(c) a backward diode connected from said first junction to a third junction maintained at said reference potential, said backward diode being poled to allow normal current flow from said first to said third junction;

(d) means connected to said output junction for maintaining a predetermined current flow through said second tunnel diode;

(e) means including a source of single-phase sinusoidal potential coupled to said first junction for periodically decreasing and increasing the current flow through said first and second tunnel diodes whereby both of said tunnel diodes periodically revert to the unswitched mode of current conduction in response to said periodic decreases in current flow thereby to produce a substantially constant first potential level at said output junction; and (f) means responsive to a plurality of bi-level input signals, representative of binary "1" or binary "0" for diverting at least a portion of the current flow through said second tunnel diode only when no less than one of said plurality of bi-level input signals is representative of binary "1" thereby to switch said second tunnel diode during each periodic increase in current flow therethrough when no portion of the current flow through said second tunnel diode is diverted or to switch said first tunnel diode during each periodic increase in current flow therethrough when at least a portion of the current flow through said second tunnel diode is diverted, the switching of said second tunnel diode generating a second potential level at said output junction.

6. A digital computer device comprising:

(a) first and second tunnel diodes having first and second peak currents, respectively, serially connected in the order named from a first junction to an output junction and from said output junction to a second junction, said first and second tunnel diodes being poled to allow normal current flow therethrough from said second to said first junction and said second peak current being no less than said first peak current;

(b) means connected to said second junction for maintaining said second junction at a substantially fixed positive potential relative to a reference potential;

(c) a backward diode connected from said first junction to a third junction maintained at said reference potential, said backward diode being poled to allow normal current flow from said third to said first junction;

(d) means connected to said output junction for maintaining a predetermined current flow through said second tunnel diode;

(e) means including a source of single-phase sinusoidal potential coupled to said first junction for periodically decreasing and increasing the current flow through said first and second tunnel diodes whereby both of said tunnel diodes periodically revert to the unswitched mode of current conduction in response to said periodic decreases in current flow thereby to produce a substantially constant first potential level at said output junction; and (f) means responsive to a plurality of bi-level input signals, representative of binary "1" or binary "0" for diverting at least a portion of the current flow through said second tunnel diode only when no less than one of said plurality of bi-level input signals is representative of binary "1" thereby to switch said second tunnel diode during each periodic increase in current flow therethrough when no portion of the current flow through said second tunnel diode is diverted or to switch said first tunnel diode during each periodic increase in current flow therethrough when at least a portion of the current flow through said second tunnel diode is diverted, the switching of said second tunnel diode generating a second potential level at said output junction.

7. A digital computer device comprising:

(a) first and second tunnel diodes having first and second peak currents, respectively, serially connected in the order named from a first junction to an output junction and from said output junction to a second junction, said first and second tunnel diodes being poled to allow normal current flow therethrough from said second to said first junction and said second peak current being no less than said first peak current;

(*b*) means connected to said second junction for maintaining said second junction at a substantially fixed positive potential relative to a reference potential;

(*c*) a backward diode connected from said first junction to a third junction maintained at said reference potential, said backward diode being poled to allow normal current flow from said third to said first junction;

(*d*) means connected to said output junction for maintaining a predetermined current flow through said second tunnel diode;

(*e*) means including a source of single-phase sinusoidal potential coupled to said first junction for periodically decreasing and increasing the current flow through said first and second tunnel diodes whereby both of said tunnel diodes periodically revert to the unswitched mode of current conduction in response to said periodic decreases in current flow thereby to produce a substantially constant first potential level at said output junction; and (*f*) means responsive to a plurality of bi-level input signals representative of binary "1" or binary "0" for not increasing said plurality of bi-level input signals are representative of binary "0" and for increasing said current flow through said second tunnel diode when at least one of said plurality of bi-level input signals is representative of binary "1" thereby to switch said second tunnel diode during each periodic increase in current flow therethrough when no less than one of said plurality of input signals is representative of binary "1" whereby the switching of said second tunnel diode generates a second potential level at said output junction.

References Cited in the file of this patent

G.E. Tunnel Diode Manual, Mar. 20, 1961 (pages 58 to 60 relied on).

Hoffman Electronics Corporation Advertising Brochure, 1960 (pages 8, 9, 40 relied on).

Proceedings of the Eastern Joint Computer Conference, 1959 (pages 43 and 44 relied on).

R.C.A. Technical Note No. 514, March 1962 (Sheets 1 to 3 relied on).

UNITED STATES PATENT OFFICE
CERTIFICATE OF CORRECTION

Patent No. 3,155,846 November 3, 1964

O D Parham

It is hereby certified that error appears in the above numbered patent requiring correction and that the said Letters Patent should read as corrected below.

Column 2, line 52, strike out '"valley voltage" $V_V$, of the tunnel diode and occurs, for' and insert instead -- valley voltage again produce an increase in current flow. --; column 11, line 13, for "other" read -- order --.

Signed and sealed this 6th day of April 1965.

(SEAL)
Attest:

ERNEST W. SWIDER
Attesting Officer

EDWARD J. BRENNER
Commissioner of Patents